US011738259B2

(12) United States Patent
Yang

(10) Patent No.: US 11,738,259 B2
(45) Date of Patent: Aug. 29, 2023

(54) GUN VIBRATION STRUCTURE FOR SOMATOSENSORY GAMES

(71) Applicant: VAR Live International Limited, Kowloon (HK)

(72) Inventor: Andy Yang, Kaohsiung (TW)

(73) Assignee: VAR LIVE INTERNATIONAL LIMITED, Kowloon (HK)

( * ) Notice: Subject to any disclaimer, the term of this patent is extended or adjusted under 35 U.S.C. 154(b) by 59 days.

(21) Appl. No.: 17/624,020

(22) PCT Filed: Jul. 2, 2019

(86) PCT No.: PCT/CN2019/094346
§ 371 (c)(1),
(2) Date: Dec. 30, 2021

(87) PCT Pub. No.: WO2021/000249
PCT Pub. Date: Jan. 7, 2021

(65) Prior Publication Data
US 2022/0347558 A1    Nov. 3, 2022

(51) Int. Cl.
*A63F 13/219*      (2014.01)
(52) U.S. Cl.
CPC ................... *A63F 13/219* (2014.09)
(58) Field of Classification Search
CPC .................................................. A63F 13/219
See application file for complete search history.

(56) References Cited

U.S. PATENT DOCUMENTS 9,151,564 B1 * 10/2015 Baxter ...................... F41G 1/38
2004/0204240 A1 * 10/2004 Barney .................. A63J 21/00
463/36
(Continued)

FOREIGN PATENT DOCUMENTS

CN      201426967 Y    3/2010
CN      102949845 A    3/2013
(Continued)

OTHER PUBLICATIONS

International Search Report dated Mar. 30, 2020 in corresponding PCT Application PCT/CN2019/094346, with English translation, 4 pages.

*Primary Examiner* — Reginald A Renwick
(74) *Attorney, Agent, or Firm* — MUNCY, GEISSLER, OLDS & LOWE, P.C.

(57) ABSTRACT

The present invention provides a gun vibration structure for somatosensory games, including a gun body, a trigger, a microswitch, a vibration unit, and a connector. The gun body includes a body portion and a grip portion. The body portion includes a housing space. The trigger is on the grip portion. The microswitch is on the grip portion and pressed by the trigger to be actuated. The vibration unit is in the housing space. The vibration unit includes an electromagnet and an actuation rod passing therethrough. When the electromagnet is electrified, the actuation rod reciprocates with respect to the electromagnet, ramming the body portion for generating the vibration in the housing space. The connector is on the grip portion and electrically connected with the microswitch and the electromagnet. The actuation rod is triggered to ram the body portion, generating a realistic vibration.

7 Claims, 4 Drawing Sheets

(56) References Cited

U.S. PATENT DOCUMENTS

2009/0233768 A1* 9/2009 Merzenich .............. G06F 3/038
                                                          482/8
2018/0140945 A1   5/2018 Grant et al.
2021/0236915 A1* 8/2021 Rudell ................. A63F 13/323

FOREIGN PATENT DOCUMENTS

| CN | 106871714 A | 6/2017 |
| CN | 209541540 U | 10/2019 |
| JP | 4517721 B2 | 8/2010 |

* cited by examiner

GUN VIBRATION STRUCTURE FOR SOMATOSENSORY GAMES

BACKGROUND OF THE INVENTION

1. Field of the Invention:

The present invention relates to somatosensory game devices, and more particularly, to a gun vibration structure for somatosensory games.

2. Description of the Related Art:

Virtual reality (also known as VR) refers to the use of computer simulation for generating a three-dimensional virtual world, which provides users with a simulation of vision and other sensations, allowing users to feel like being in an actual environment. Such technology has currently been used in somatosensory games which are popular with consumers.

In some somatosensory games, in order to allow users to have a more realistic and vivid effects during the game, a vibration motor is specifically installed on corresponding equipment. Taking shooting games as an example, the vibration motor is installed on a gun thereof for producing a vibration effect during shooting, thereby increasing the realistic sense of shock.

However, the aforementioned vibration motor has a relatively larger power consumption and a shorter service life. Also, the vibration effect of the vibration motor is not obvious enough, so that the games are not sufficiently realistic.

SUMMARY OF THE INVENTION

To improve the issues above, the present invention discloses a gun vibration structure for somatosensory games. The gun body applies the electrification and diselectrification processes of the electromagnet to force the actuation rod to reciprocate for ramming the gun body forward and backward, whereby the gun body generates an obvious and realistic vibration effect.

For achieving the aforementioned objectives, a gun vibration structure for somatosensory games in accordance with an embodiment of the present invention is provided, comprising a gun body, a trigger, a microswitch, a vibration unit, and a connector. The gun body comprises a body portion and a grip portion. The body portion comprises a housing space. The trigger is disposed on the grip portion, The microswitch is disposed on the grip portion and pressed by the trigger to be actuated. The vibration unit is disposed in the housing space. The vibration unit comprises an electromagnet and an actuation rod passing through the electromagnet. When the electromagnet is electrified, the actuation rod slides to reciprocate with respect to the electromagnet, so as to ram the body portion for generating the vibration in the housing space. The connector is disposed on the grip portion and electrically connected with the microswitch and the electromagnet.

In another embodiment, the actuating rod comprises a first end and a second end. The housing space comprises a first fix block and a second fix block in opposite to the first fix block. When the electromagnet is electrified, the actuation rod produces a travel, such that the first end rams the first fix block, and the second end subsequently rams the second fix block.

In another embodiment, the second end comprises a stop, with a recover spring disposed between the stop and the electromagnet, such that when the electromagnet is diselectrified, the actuation rod moves backs by the recover spring, and the second end rams the second fix block.

In another embodiment, the operation direction of the actuation rod is in parallel to the trigger. The housing space comprises a fix seat therein, in which the electromagnet is installed.

In another embodiment, therein, the connector is electrically connected with a control device through a transmission cable.

In another embodiment, the top face of the body portion comprises a fix portion formed in a consecutive concave and convex shape along the length direction.

In another embodiment, the profile of the gun body is in a form of handgun.

With such configuration, the present invention substitutes the vibration motor with the electromagnet and the actuation rod. During the electrification and diselectrification processes of the electromagnet, the actuation rod reciprocates to ram the gun body forward and backward, whereby the gun body produces an obvious and realistic vibration effect, and also is provided with advantages of longer service life and lower power consumption.

DETAILED DESCRIPTION OF THE INVENTION

Figure 1:
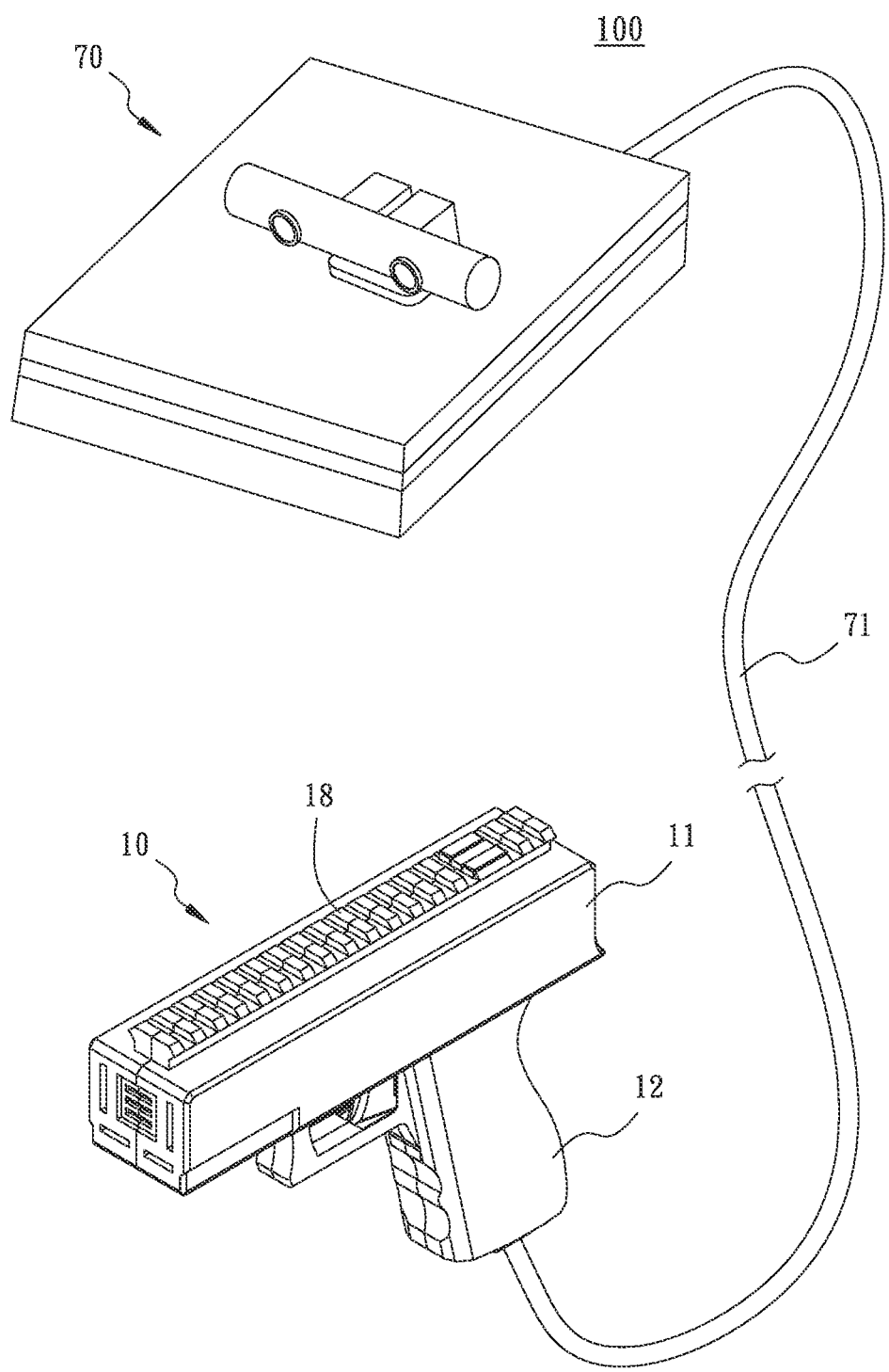
FIG. 1 is a perspective view of the appearance of the present invention, illustrating that the gun body is electrically connected with the control device through the transmission cable.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 4, the present invention provides a gun vibration structure 100 for somatosensory games; comprising a gun body 10, a trigger 20, a microswitch 30, a vibration unit 40, and a connector 50. In the embodiment of the present invention, the profile of the gun body 10 is in a form of handgun; in other embodiment, it can also be in a form of rifle.

Figure 2:
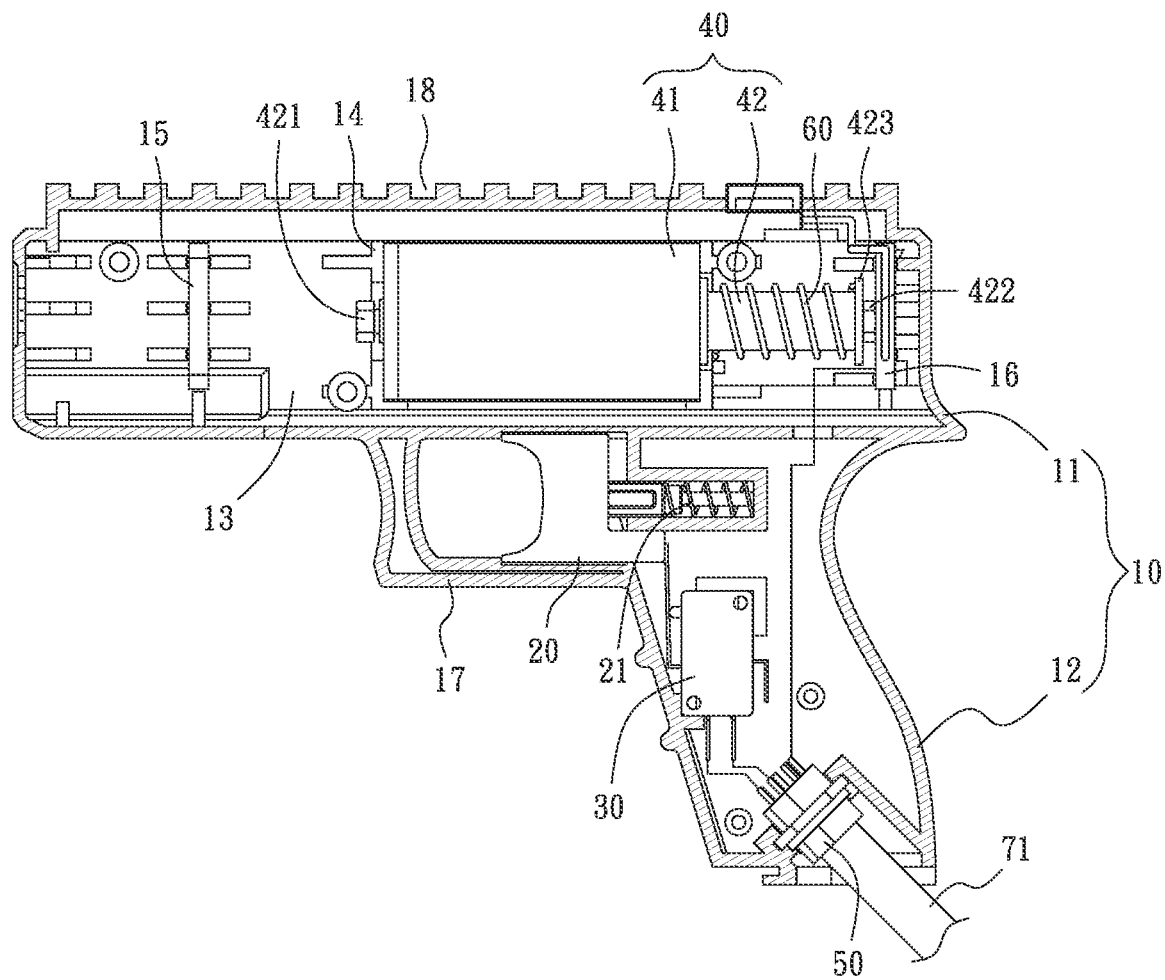
FIG. 2 is a sectional view of the present invention, illustrating that the trigger is not yet pressed, and the actuation rod is at the first position.

The gun body 10 comprises a body portion 11 and a grip portion 12. The body portion 11 comprises a housing space 13 which is approximately formed in a long shape and comprises a fix seat 14. As shown by FIG. 2, the fix seat 14 comprises a first fix block 15 on the front side thereof, and a second fix block 16 on the rear side thereof. The first fix block 15 and the second fix block 16 are fixed to the body portion 11 or integrally formed with the body portion 11.

The trigger 20 is disposed on the front side of the grip portion 12. Therein, the trigger 20 is located in a trigger guard 17 for being pressed to operate by the user. A recover spring 21 is disposed behind the trigger 20 for recovering the position of the trigger 20.

The microswitch 30 is disposed on the grip portion 12 and actuated by the trigger 20 which is pressed.

The vibration unit 40 is disposed in the housing space 13. The vibration unit 40 comprises an electromagnet 41 and an actuation rod 42 passing through the electromagnet 41. In the embodiment of the present invention, the operation voltage of the electromagnet 41 is a 24V direct current. When the electromagnet 41 is electrified, the actuation rod 42 is allowed to reciprocate with respect to the electromagnet 41, so as to ram the body portion 11 to generate the vibration in the housing space 13. To further illustrate, the actuation rod 42 comprises a first end 421 and a second end 422, wherein the first end 421 faces the first fix block 15, and the second end 422 faces the second fix block 16. When the electromagnet 41 is electrified, the coil inside the electromagnet 41 generate a magnetic field effect, such that the actuationod 42 moves from a first position to a second position; when the electromagnet 41 is diselectrified, the actuation rod 42 recovers from the second position to the first position. The process of the actuation rod 42 moving from the first position to the second position and then moving from the second position back to the first position is defined as a travel. In this travel of the actuation rod 42, the first end 421 rams the first fix block 15, and the second end 422 subsequently rams the second fix block 16. Such ramming allows the gun body 10 to produce a realistic vibration effect, so that the user holding the gun body 10 feels an obvious and realistic vibration.

Also, the second end 422 of the actuation rod 42 comprises a stop 423, with a recover spring 60 disposed between the stop 423 and the electromagnet 41. Therefore, when the electromagnet 41 is diselectrified, the actuation rod 42 moves from the second position back to the first position by the recover spring 60, whereby the second end 422 rams the second fix block 16. Therein, the operation direction of the actuation rod 42 is in parallel to the trigger 20.

Further, the connector 50 is an 8 P metal male connector. The connector 50 is disposed at the distal end of the grip portion 12 and electrically connected with the microswitch and the electromagnet 41. Furthermore, the signal connector 50 is electrically connected with a control device 70 through a transmission cable 71. The control device 70 sends the power and signal to the connector 50, such that when the microswitch 30 is pressed, the electromagnet 41 is electrified to operated.

In the present invention, the top face 11 of the body portion 11 comprises a fix portion 18 formed in a consecutive concave and convex shape, facilitating the removable combination between the gun body 10 and the signal sensing device of the somatosensory games.

Figure 3:
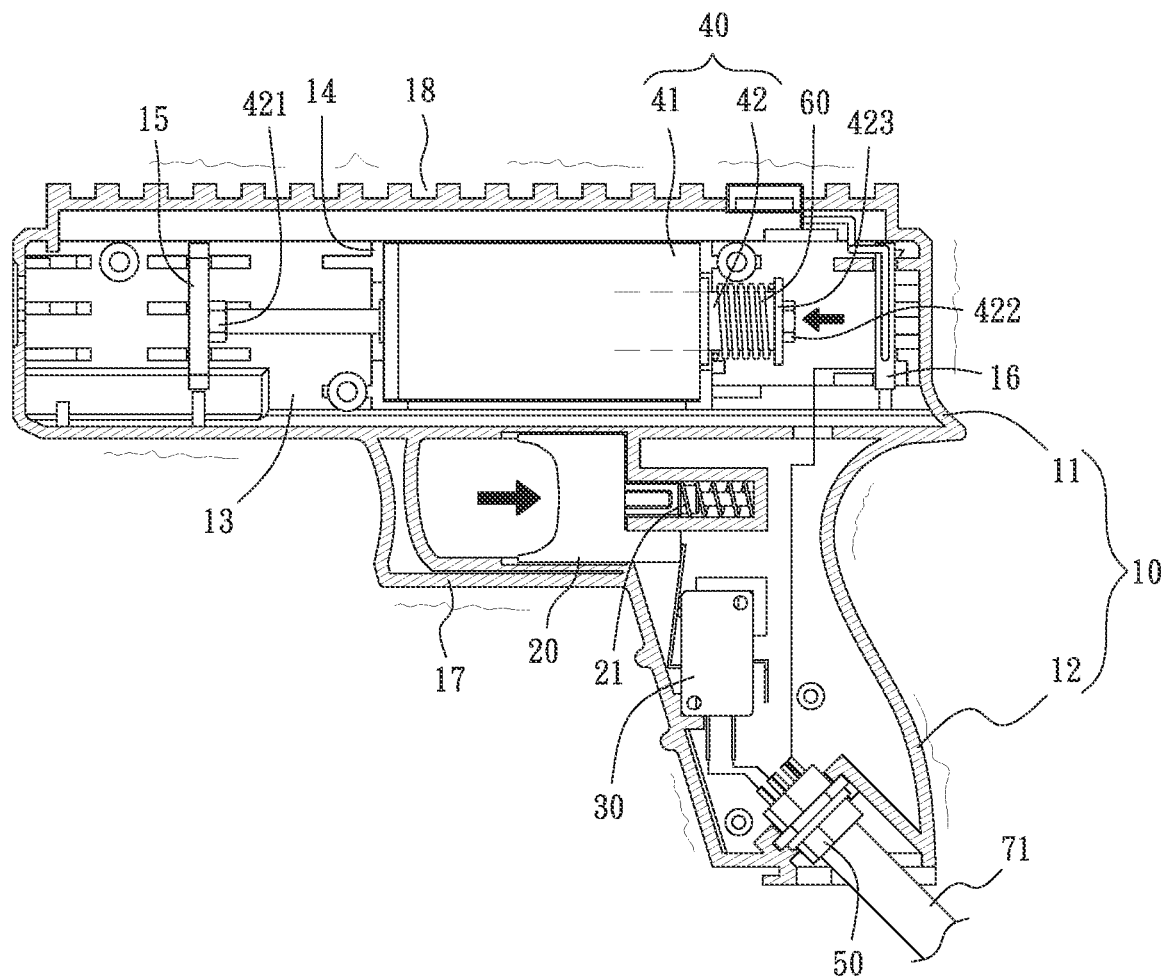
FIG. 3 is a schematic view of the operation of the electromagnet of the present invention, illustrating that the trigger is pressed to electrify the electromagnet, so that the actuation rod moves from the first position to the second. position for ramming the first fix block.
Figure 4:
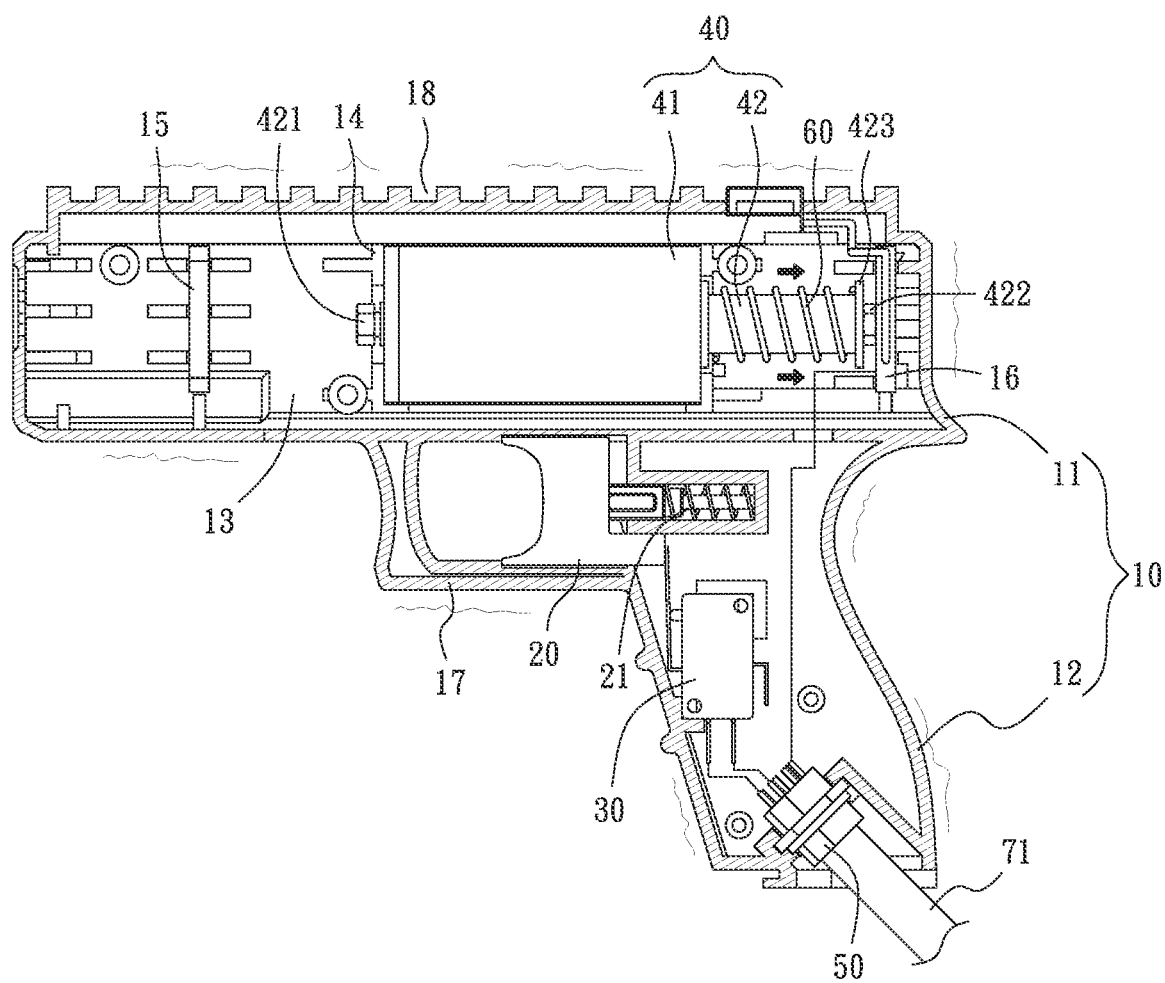
FIG. 4 is a schematic view of the operation of the electromagnet of the present invention, illustrating that the electromagnet is diselectrified, so that the actuation rod moves from the second position to the first position for ramming the second fix block.

Referring to FIG. 2 to FIG. 4, the operation status of the present invention is illustrated. As shown by FIG. 2, when the present invention is not operated, the actuation rod 42 of the vibration unit 40 is at the first position, wherein the actuation rod 42 is under the elastic effect of the recover spring 60, and the first end 421 does not yet protrude with respect to the electromagnet 41.

As shown by FIG. 3, when the user presses the trigger 20, the trigger 20 actuates the microswitch 30, and the microswitch 30 sends the signal back to the control device 70; the control device 70 electrifies the electromagnet 41, and the actuation rod 42 is triggered to move from the first position to the second position, whereby the first end 421 rams the first fix block 15 of the gun body 10.

As shown by FIG. 4, when the electromagnet 41 is diselectrifeid, the actuation rod 42 moves from the second. position back to the first position, whereby the second end 422 rams the second fix block 16 of the gun body 10, so that the gun body 10 produces the vibration effect. Therefore, when the user, during the gaming process, repeatedly presses the trigger 20, the actuation rod 42 is repeatedly operated, so as to continuously and alternately rams the first fix block 15 and the second fix block 16, whereby the gun body 10 produces obvious vibration effects due to repeating ramming of the actuation rod 42, providing the user with realistic sensation for enjoying somatosensory games.

The present invention substitutes the vibration motor with the electromagnet 41 and the actuation rod 42, not only providing an obvious vibration effect, but also achieving advantages of longer service life and lower power consumption.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gun vibration structure for somatosensory games, comprising:
    a gun body comprising a body portion and a grip portion, the body portion comprising a housing space;
    a trigger disposed on the grip portion;
    a microswitch disposed on the grip portion and being actuated by the trigger when the trigger is pressed;
    a vibration unit disposed in the housing space, the vibration unit comprising an electromagnet and an actuation rod passing through the electromagnet; when the electromagnet is electrified, the actuation rod reciprocates with respect to the electromagnet to ram the body portion for producing vibration in the housing space; and
    a connector disposed on the grip portion, the connector being electrically connected with the microswitch and the electromagnet.

2. The gun vibration structure for somatosensory games of claim 1 wherein the actuation rod comprises a first end and a second end; the housing space comprises a first fix block and a second fix block disposed in opposite to the first fix block; when the electromagnet is electrified, the actuation rod generates a. travel, such that the first end rams the first fix block, and the second end subsequently rams the second fix block.

3. The gun vibration structure for somatosensory games of claim 2, wherein the second end comprises a stop, with a recover spring disposed between the stop and the elecomagnet, such that when the electromagnet is diselectrified, the actuation rod recovers by the recover spring, whereby the second end rams the second fix block.

4. The gun vibration structure for somatosensory games of claim 3, wherein an operation direction of the actuation rod is in parallel to the trigger; the housing space comprises a fix seat therein, in which the electromagnet is installed.

5. The gun vibration structure for somatosensory games of claim 4, wherein the connector is electrically connected with a control device through a transmission cable.

6. The gun vibration structure for somatosensory games of claim 5, wherein a top face of the body portion comprises a fix portion formed in a consecutive concave and convex shape.

7. The gun vibration structure for somatosensory games of claim 6, wherein a profile of the gun body is in a form of handgun.

* * * * *